(12) United States Patent
Murayama et al.

(10) Patent No.: US 6,342,936 B1
(45) Date of Patent: Jan. 29, 2002

(54) LIQUID CRYSTAL DISPLAY DEVICE

(75) Inventors: Akio Murayama; Takeshi Takase, both of Hyogo-ken (JP)

(73) Assignee: Kawasaki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/105,175

(22) Filed: Jun. 26, 1998

(30) Foreign Application Priority Data

Jun. 27, 1997 (JP) ............................................. 9-171376

(51) Int. Cl.[7] ...................... G02F 1/1343; G02F 1/1335
(52) U.S. Cl. .......................... 349/141; 349/117; 349/119
(58) Field of Search .................................. 349/141, 143, 349/139, 117, 118, 119, 120

(56) References Cited

U.S. PATENT DOCUMENTS

| | | | | |
|---|---|---|---|---|
| 5,440,413 A | * | 8/1995 | Kikuchi et al. | 359/73 |
| 5,570,214 A | * | 10/1996 | Abileah et al. | 359/73 |
| 5,598,285 A | * | 1/1997 | Kondo et al. | 349/141 |
| 5,650,833 A | * | 7/1997 | Akatsuka et al. | 349/118 |
| 5,739,881 A | * | 4/1998 | Xu et al. | 349/118 |
| 5,867,240 A | * | 2/1999 | Crawford et al. | 349/118 |

FOREIGN PATENT DOCUMENTS

JP        7-261152      10/1995

* cited by examiner

Primary Examiner—William L. Sikes
Assistant Examiner—Tarifur R. Chowdhury
(74) Attorney, Agent, or Firm—Pillsbury Winthrop LLP

(57) ABSTRACT

A liquid crystal display device includes an array substrate and a counter substrate, a liquid crystal cell held between the substrates 300 and containing liquid crystal molecules arranged to have an alignment corresponding to alignment properties of inner surfaces of the substrates, first and second polarizing plates having individual polarization axes and mounted on outer surfaces of the first and second substrates, respectively, a pixel electrode and counter electrode formed on the array substrate to apply a lateral electric field substantially parallel to the first and second substrate into the liquid crystal cell. The liquid crystal display device controls the alignment of the liquid crystal molecules by the lateral electric field between the pixel and counter electrodes. Particularly, in the liquid crystal display device, an optical retardation plate is interposed at least between the first polarizing plate and the array substrate, and an optical axis and retardation value of the optical retardation plate are determined to compensate for twisting of the alignment of the liquid crystal molecules caused upon application of the lateral electric field.

27 Claims, 7 Drawing Sheets

LIQUID CRYSTAL DISPLAY DEVICE

BACKGROUND OF THE INVENTION

This invention relates to a liquid crystal display device, in particular, to a liquid crystal display device mainly using an electric field substantially in parallel to a display screen.

In recent years, liquid crystal display devices have been used in various fields by virtue of their merits: lightweight, thinness, and low power consumption. Particularly, a widespread liquid crystal display device has a structure in which twisted nematic (TN) liquid crystal is held between electrode substrates.

In such a conventional liquid crystal display device, the brightness and color considerably vary with the viewing angle. This is a factor which makes it difficult to comply with a demand for a large display screen.

Under the circumstances, development of a liquid crystal display device mainly using an electric field substantially in parallel to a display screen has been continuing so as to solve the problem. Such a liquid crystal display device is disclosed, for example, in Jpn. Pat. Appln. KOKAI Publication No. 63-21907.

As shown in FIG. 9, the liquid crystal display device comprises an array substrate 10 having a pixel electrode 1 and a counter electrode 3 both formed thereon, a counter substrate 20 facing the array substrate 10, and a liquid crystal cell 30 which contains TN liquid crystal molecules of a positive anisotropic dielectric constant and is held between the substrates 10 and 20. The liquid crystal cell 30 is held between the substrate 10 and 20 via aligning films 13 and 23 which are treated to align the liquid crystal molecules in the same direction R. The alignment (treatment) direction R forms a predetermined angle θ1, for example, 80° with respect to a direction of an electric field E created between the pixel electrode 1 and the counter electrode 3.

Polarizing plates 40 and 50 are respectively mounted on outer surfaces of the substrates 10 and 20 to have a cross-Nicol system in which the polarization axis P1 of the polarizing plate 40 is set in the alignment direction R, and the polarization axis P2 of the polarizing plate 50 is set in a direction orthogonal to the alignment direction R.

With this system, the light transmittance is set at a minimum value when no voltage is applied between the pixel electrode 1 and the counter electrode 3, and at a maximum value mainly by the birefringence effect of the liquid crystal molecules aligned in the electric field direction E shown in FIG. 10 when a voltage of a sufficient level is applied between the pixel electrode 1 and the counter electrode 3.

In such a liquid crystal display device, upon application of the voltage, the alignment of liquid crystal molecules is twisted in a range from the main surface of each substrate to the middle of the liquid crystal cell since a binding force is applied to the liquid crystal molecules from the main surface of each substrate due to the alignment treatment.

Since a considerable period of time is required for resuming the twisted alignment obtained by application of a voltage to an initial alignment of the molecules, the display device has a drawback that the response speed is slow. This drawback is also raised in the case where the liquid crystal cell has a negative anisotropic dielectric constant.

On the other hand, Jpn. Pat. Appln. KOKOKU Publication No. 7-261152 discloses a technique of controlling the light transmittance by selection between application of a high level voltage and application of a low level voltage, instead of selection between application of a voltage and non-application of the voltage, so as to use ICs of a low withstand voltage in a liquid crystal display device. Since this technique enables reduction in the amplitudes of voltages applied to the electrodes, ICs of a low withstand voltage can be used in the liquid crystal display device.

The inventors of the present invention have studied this technique and found that the technique enhances the response speed as a result of the control of liquid crystal molecules during which voltage application is retained.

However, it is also recognized that the contrast ratio is deteriorated due to the above-mentioned control of liquid crystal molecules during which voltage application is retained.

BRIEF SUMMARY OF THE INVENTION

The present invention has been achieved in view of the above-mentioned problem, and an object of the present invention is to provide a liquid crystal display device capable of attaining good viewing angle characteristics without deteriorating characteristics of the device, such as contrast ratio and response speed.

According to the invention, there is provided a liquid crystal display device which comprises first and second substrates; a liquid crystal cell held between the first and second substrates and containing liquid crystal molecules arranged to have an alignment corresponding to alignment properties of inner surfaces of the first and second substrates; first and second electrodes formed on the first substrate to apply a lateral electric field substantially parallel to the first and second substrate into the liquid crystal cell; first and second polarizing plates having individual polarization axes and mounted on outer surfaces of the first and second substrates, respectively; and an optical retardation plate interposed at least between the first polarizing plate and the first substrate; wherein an optical axis and retardation value of the optical retardation plate are determined to compensate for twisting of the alignment of the liquid crystal molecules caused upon application of the lateral electric field.

According to another aspect of the present invention, there is provided a liquid crystal display device which comprises first and second substrates; a liquid crystal cell held between the first and second substrates and containing liquid crystal molecules arranged to have an alignment corresponding to alignment properties of inner surfaces of the first and second substrates; first and second electrodes formed on the first substrate to apply a lateral electric field substantially parallel to the first and second substrate into the liquid crystal cell; first and second polarizing plates having individual polarization axes and mounted on outer surfaces of the first and second substrates, respectively; and first and second optical retardation plates interposed between the first polarizing plate and the first substrate and the second polarizing plate and the second substrate, respectively; wherein when a first lateral electric field is produced to obtain a dark state and a second lateral electric field is produced to obtain a bright state, optical axes and retardation values of the first and second optical retardation plates are determined to compensate for twisting of the alignment of the liquid crystal molecules caused upon application of the first lateral electric field.

In the liquid crystal display device of the present invention, a lateral electric field is used to switch the alignment of liquid crystal molecules, and thus can attain good viewing angle characteristics. Further, the optical axis and the retardation value of each optical retardation plate is determined to compensate for twisting of the liquid crystal molecules, and thus the contrast ratio can be improved while maintaining a high response speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

A liquid crystal display device according to an embodiment of the present invention will be described with reference to the accompanying drawings.

Figure 1:
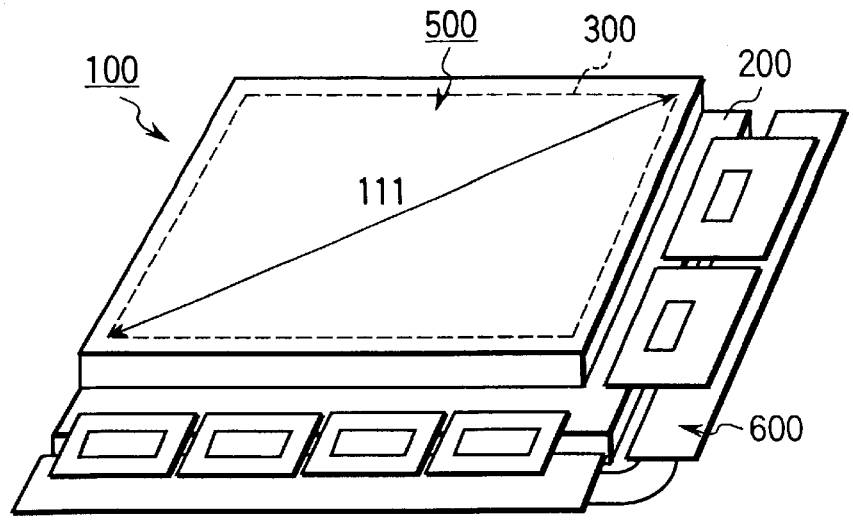
FIG. 1 is a perspective view schematically showing a liquid crystal display device according to an embodiment of the present invention.
Figure 2:
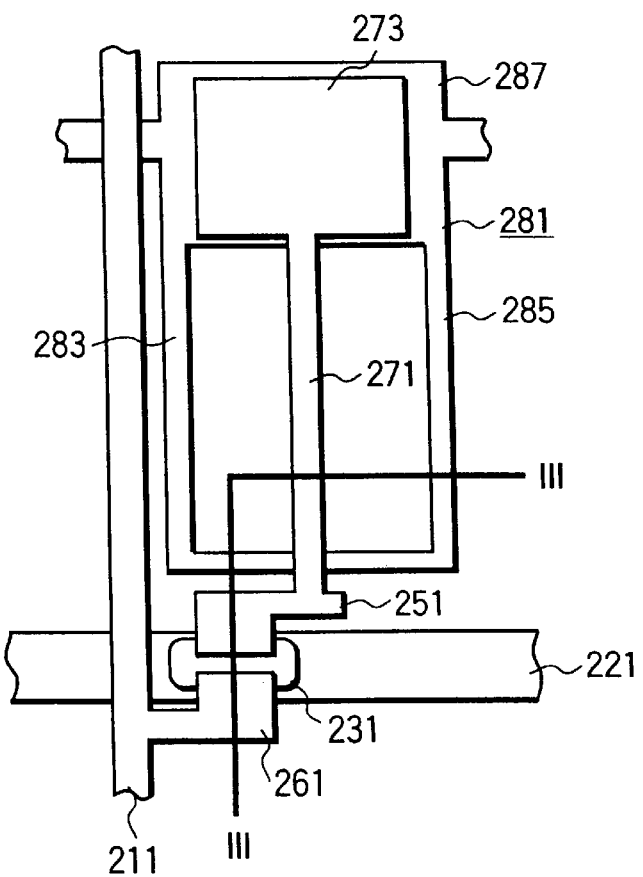
FIG. 2 is a plain view schematically showing a part of an array substrate shown in FIG. 1.
Figure 3:
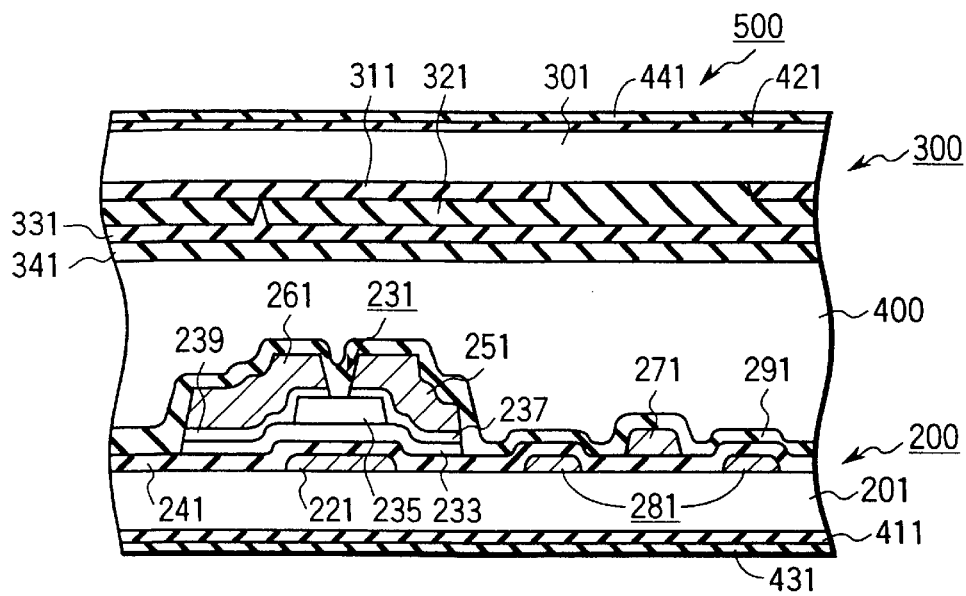
FIG. 3 is a sectional view schematically showing a section of a part of the liquid crystal panel, taken along a line III—III shown in FIG. 2.

As shown in FIG. 1, the liquid crystal display device 100 includes a liquid crystal panel 500 in which a liquid crystal cell 400 (see FIG. 3) is held between an array substrate 200 and a counter substrate 300, and a driving circuit section 600 for driving the liquid crystal panel 500. The liquid crystal panel 500 includes an effective display area 111 having a diagonal size of 15 inches and capable of displaying a color image. In the liquid crystal panel 500, (1024×3)×786 display pixels are arranged in matrix.

The array substrate 200 for the liquid crystal panel 500 includes 1024×3 signal lines 211 having a multi-layered structure of molybdenum/aluminum/molybdenum, 786 scanning lines 221 of molybdenum-tungsten alloy (Mo—W alloy), and thin film transistors (TFTs) 231. The signal lines 211 and the scanning lines 221 are arranged to intersect at right angles and the TFTs 231 are arranged near intersections of the signal lines 211 and the scanning lines 221, on a transparent grass substrate 201. The glass substrate 201 has a polished surface and a thickness of 0.7 mm. More specifically, each TFT 231 has a gate electrode is formed of one of the scanning lines 221, a gate insulating film 241 made of silicon nitride (SiNx), an amorphous silicon hydride semiconductor layer (a-Si:H) 233 formed over the gate electrode via the gate insulating film 241. A channel protection film 235 made of a silicon nitride film (SiNx) is positioned on the amorphous silicon hydride semiconductor layer (a-Si:H) 233, and source and drain electrodes 251 and 261 are electrically connected to the a-Si:H film 233 via low-resistance amorphous silicon hydride semiconductor layers ($n^+$a-Si:H) 237 and 239 in which phosphorus is doped. The drain electrode 261 is integrally formed with one of the signal lines 211. The source electrode 251 has a multi-layered structure of molybdenum/aluminum/molybdenum, similarly to the signal lines, and extends along one of the signal lines 211 to form a stripe serving as a pixel electrode 271. Further, a first storage capacitance electrode 273 is formed in contact with an end of the stripe and serves as a storage capacitance Cs. A counter electrode 281 is made of Mo—W alloy similarly to the scanning line 221, and arranged substantially in parallel with the scanning line 221. The counter electrode 281 has first and second electrodes 283 and 285 arranged substantially in parallel with the pixel electrode 271, and a second storage capacitance electrode 287 which overlaps the first storage capacitance electrode 273 via the gate insulating film 241 interposed therebetween. With this structure, the liquid crystal molecules are controlled by a lateral electric field between the pixel electrode 271 and the first electrode 283 and a lateral electric field between the pixel electrode 271 and the second electrode 285. The array substrate 200 further has an aligning film 291 arranged to cover these electrodes.

The counter substrate 300 for the liquid crystal panel 500 includes a transparent glass substrate 301 which has a polished surface and a thickness of 0.7 mm, and a light shielding film 311 which is made of resin and arranged on the glass substrate 301 for the pixel matrix. The light shielding film 311 shields lights leaked from gaps between the signal lines 211 and the counter electrodes 281 and between the scanning lines 221 and the counter electrodes 281 in the array substrate 200, and lights undesirably irradiating the TFTs 231. In openings of the shielding film 311, color filters 321 of red (R), blue (B), and green (G) are arranged to enable displaying of a color image. Further, an aligning film 341 is formed on a smoothing layer 331 which is made of transparent resin and covers the color filters 321.

In a gap between the array substrate 200 and the counter substrate 300, fine polymers (not shown) are dispersed so that a distance d between the substrates 200 and 300 is maintained at 3.5 µm, for example. The substrate distance d is preferable to be set within a range of 1.5 to 5.5 µm, more desirably, within a range of 3.0 to 4.0 µm in order to attain an adequate response speed of liquid crystal with a low voltage, and to secure the uniformity of display performance.

The liquid crystal cell 400 is made of a nematic liquid crystal material which is held in the gap between the substrates 200 and 300 and has positive anisotropic dielectric constant $\epsilon$ of 10.7, anisotropic refractive index $\Delta n$ of 0.10, and viscosity of 21 cps.

On the array substrate 200, the liquid crystal molecules in the liquid crystal cell 400 are aligned by the aligning film 291 which is alignment-treated such that the liquid crystal molecules form a pretilt angle θ of 5° with respect to the array substrate 200 and form an acute angle θR1 with respect to the electric field direction E of the lateral electric field between the pixel electrode 271 and the counter electrode 281. On the counter substrate 300, the liquid crystal molecules in the liquid crystal cell 400 are aligned by aligning film 341 which is alignment-treated such that the liquid crystal molecules form a pretilt angle θ of 5° with respect to the array substrate 300 and form an acute angle θR2 with respect to the electric field direction E of the lateral electric field between the pixel electrode 271 and the counter electrode 281. Alignment directions R1 and R2 of the liquid crystal molecules are opposite to each other.

The angles θR1 and θR2 are normally set at the same value less than 90° and not less than 45°, preferably within a range of 60° to 88°.

Optical retardation plates 411 and 421 are respectively mounted on the outer surface of the array substrate 200 and the outer surface of the counter substrate 300 such that the optical axis W1 of the plate 411 forms a predetermined angle θW1 with respect to the alignment direction R1, and the optical axis W2 of the plate 421 forms a predetermined angle θW2 with respect to the alignment direction R2. The angles θW1 and θW2 are preferably set within a range of 45° to 135°, or 60° to 90°, or more preferably, 80° to 90°.

Further, polarizing plates 431 and 441 such as G1220DU (manufactured by NITTO DENKO CO., LTD.) are respectively mounted on the outer surfaces of the optical retardation plates 411 and 421 such that the polarizing axis of the plate 431 forms an angle θP1 with respect to the lateral electric field E between the pixel electrode 271 and the counter electrode 281, and the polarizing axis of the plate 441 forms an angle θP2 with respect to the lateral electric field E between the pixel electrode 271 and the counter electrode 281.

With the above-mentioned structure, the geometrical aperture ratio of the liquid crystal panel 500 is set at 30% when the transmittance of the color filters 321 and the like are not taken into consideration.

Figure 4A:
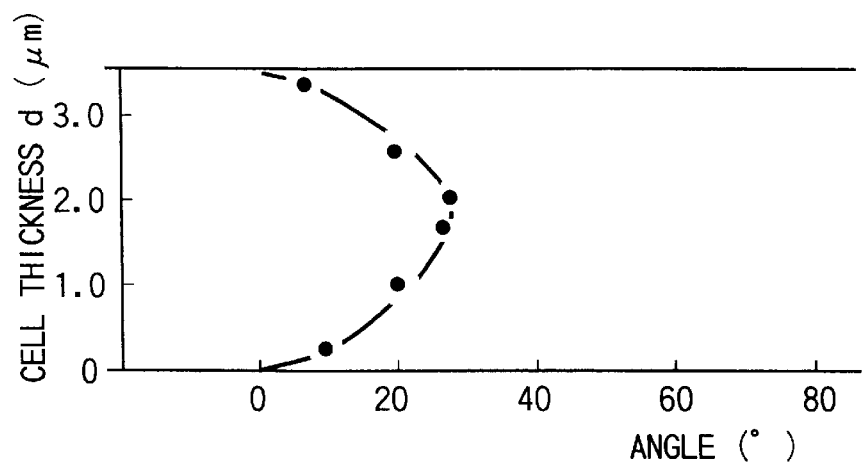
FIGS. 4A and 4B are graphs showing a twisted alignment of liquid crystal molecules in a liquid crystal cell shown in FIG. 3.
Figure 4B:
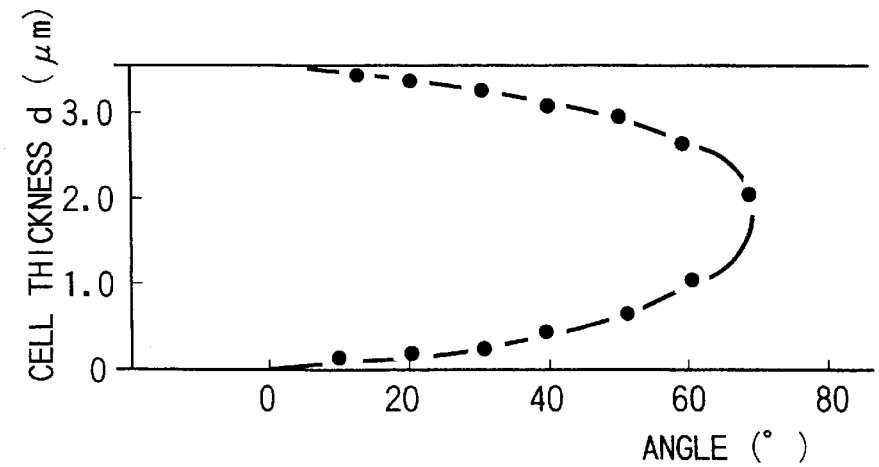

The function of the optical retardation plates 411 and 421 of the liquid crystal panel 500 will be described below. FIG. 4A shows an alignment of the liquid crystal molecules obtained when a voltage of 4.0V is applied between the pixel electrode 271 and the counter electrode 281, and FIG. 4B shows an alignment of the liquid crystal molecules obtained when a voltage of 10.0V is applied between the pixel electrode 271 and the counter electrode 281.

As should be clear from these graphs, the alignment of the liquid crystal molecules is twisted both in the cases where a low voltage is applied thereto and where a high voltage is applied thereto. Twisting of the alignment of the liquid crystal molecules decreases the contrast ratio of the liquid crystal display device since the light transmittance is reduced when a bright state is designated, and light leakage occurs when a dark state is designated.

In the present embodiment, the optical retardation plates 411 and 421 are provided to compensate for undesired twisting of the alignment of the liquid crystal molecules which may decrease the constant ratio. With this compensation, only liquid crystal molecules located in the middle of the liquid crystal cell and contributing to switching of the display state are aligned into a substantially uniform direction, and this alignment direction is determined as a reference for improving the light transmittance in the bright state and suppressing light leakage in the dark state.

The retardation values Rr1 and Rr2 of the optical retardation plates 411 and 421 can be determined on the basis of the retardation value RLc of the liquid crystal cell 400, in the following manner, for example:

When the retardation value RLc of the liquid crystal cell 400 can be obtained from the formula $\Delta n \cdot d \cdot \cos^2 \theta$ where the pretilt angle of the liquid crystal molecules is denoted as θ, the substrate distance is denoted as d, and anisotropic refractive index is denoted as Δn. In this embodiment, the retardation value RLc is 347 nm. As described above, the alignment of the liquid crystal molecules near each of the aligning films 291 and 341 cannot be changed according to the electric field direction since this alignment is fixed due to a binding force applied from each of the aligning films 291 and 341.

For example, when the dark state (where a high voltage is applied) is designated in a normally-white mode, compensation needs to be performed for the alignment of liquid crystal molecules separated from the aligning films 291 and 341 by a distance of about 0.05·d to 0.20·d and not accurately aligned according to the electric field. Assuming that the optical retardation plates 411 and 421 are formed a uniaxial oriented films, the retardation values Rr1 and Rr2 thereof are preferable to be set at 0.05·RLc to 0.20·RLc, more desirably, 0.08·RLc to 0.12·RLc where RLc is the retardation value of the liquid crystal cell 400. If one of the optical retardation plates 411 and 421 is eliminated, the retardation value of the remaining optical retardation plate is preferably set within a range of 0.10·RLc to 0.40·RLc, more desirably, 0.15·RLc to 0.25·RLc.

On the other hand, when the dark state (where a low voltage is applied) is designated in a normally-black mode, compensation needs to be performed for the alignment of liquid crystal molecules separated from the aligning films 291 and 341 by a distance about $d \cdot \frac{1}{7}$ to $d \cdot \frac{4}{9}$ and not accurately aligned according to the electric field. Assuming that the optical retardation plates 411 and 421 are formed as uniaxial oriented films, the retardation values Rr1 and Rr2 thereof are preferable to be set at $\frac{1}{7} \cdot RLc$ to $\frac{4}{9} \cdot RLc$, more desirably, $\frac{1}{4} \cdot RLc$ to $\frac{4}{9} \cdot RLc$ where RLc is the retardation value of the liquid crystal cell 400. If one of the optical retardation plates 411 and 421 is eliminated, the retardation value of the remaining optical retardation plate is preferably set within a range of $\frac{1}{3} \cdot RLc$ to $\frac{2}{3} \cdot RLc$.

Instead of the uniaxial oriented films, the optical retardation plates 411 and 421 may be formed as films for a twisted alignment, for example. In this case, the retardation values can be slightly larger than the above-mentioned values, and preferably increased from the above-mentioned values by about 20%.

The optical retardation plates 411 and 421 may be formed of materials having the same retardation value, and also formed of materials having retardation values different on the side of the array substrate 200 and on the side of the counter substrate 300.

Since the electric field is more effective on the side of the array substrate 200 than on the side of the counter substrate 300, the amount of compensation on the side of the array substrate 200 can be more reduced than that on the side of the counter substrate. Accordingly, In the case where the optical retardation plates 411 and 421 are set to different retardation values, it is preferable that the retardation value of the plate 411 on the side of the array substrate 200 is set smaller than that of the plate 421 on the counter substrate 300.

The angles θW1 and θW2 respectively formed by the optical axes W1 and W2 of the optical retardation plates 411 and 421 and the alignment direction R are suitable to be set within a range of 45° to 135°, more preferably, 60° to 90°, in particular, within a range of 80° to 90°. The angles θW1 and θW2 are respectively obtained with respect to the optical axes W1 and W2 in the twisted direction of liquid crystal molecules upon application of a voltage.

Figure 5:
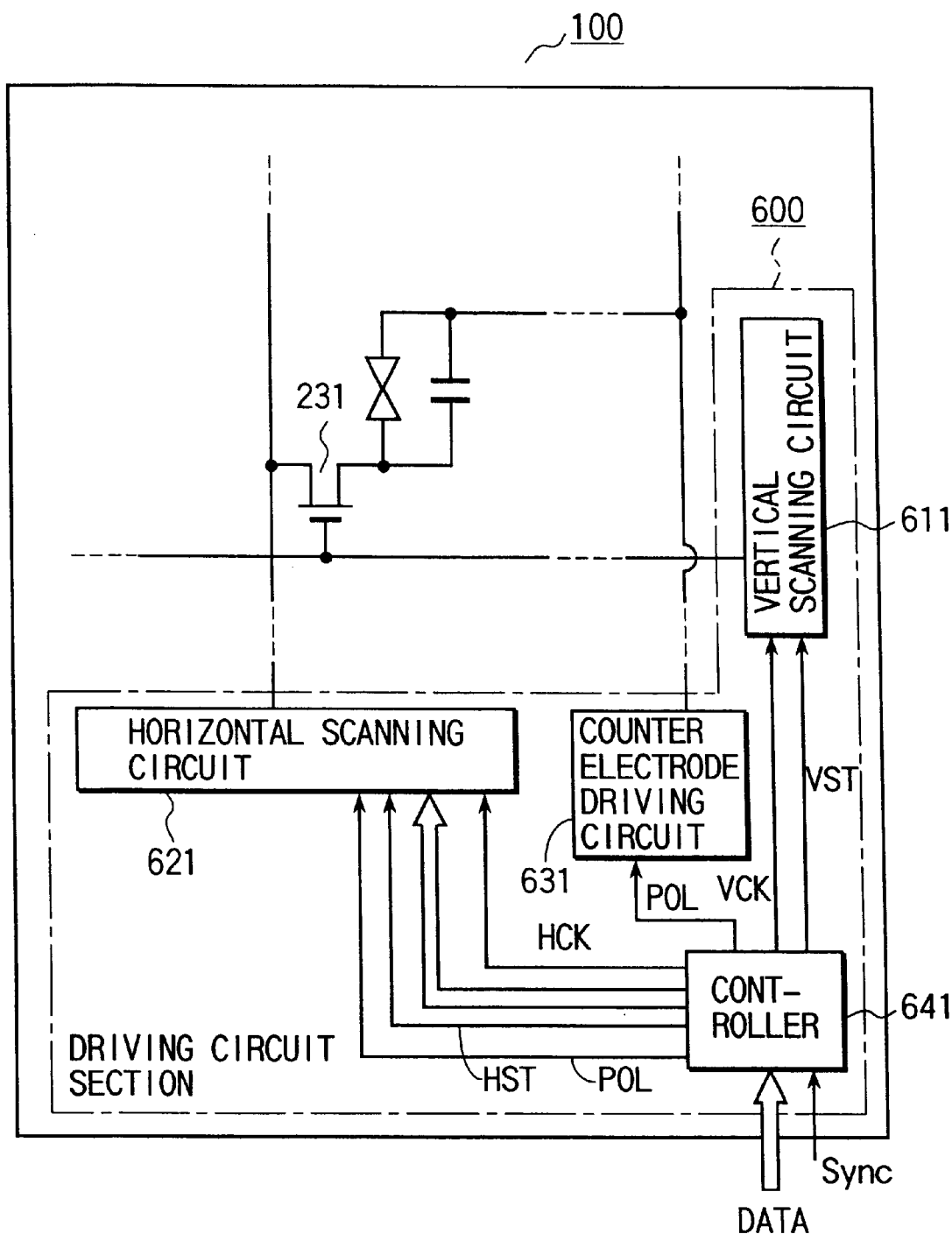
FIG. 5 is a diagram schematically showing a circuit configuration of the liquid crystal display device shown in FIG. 1.
Figure 6:
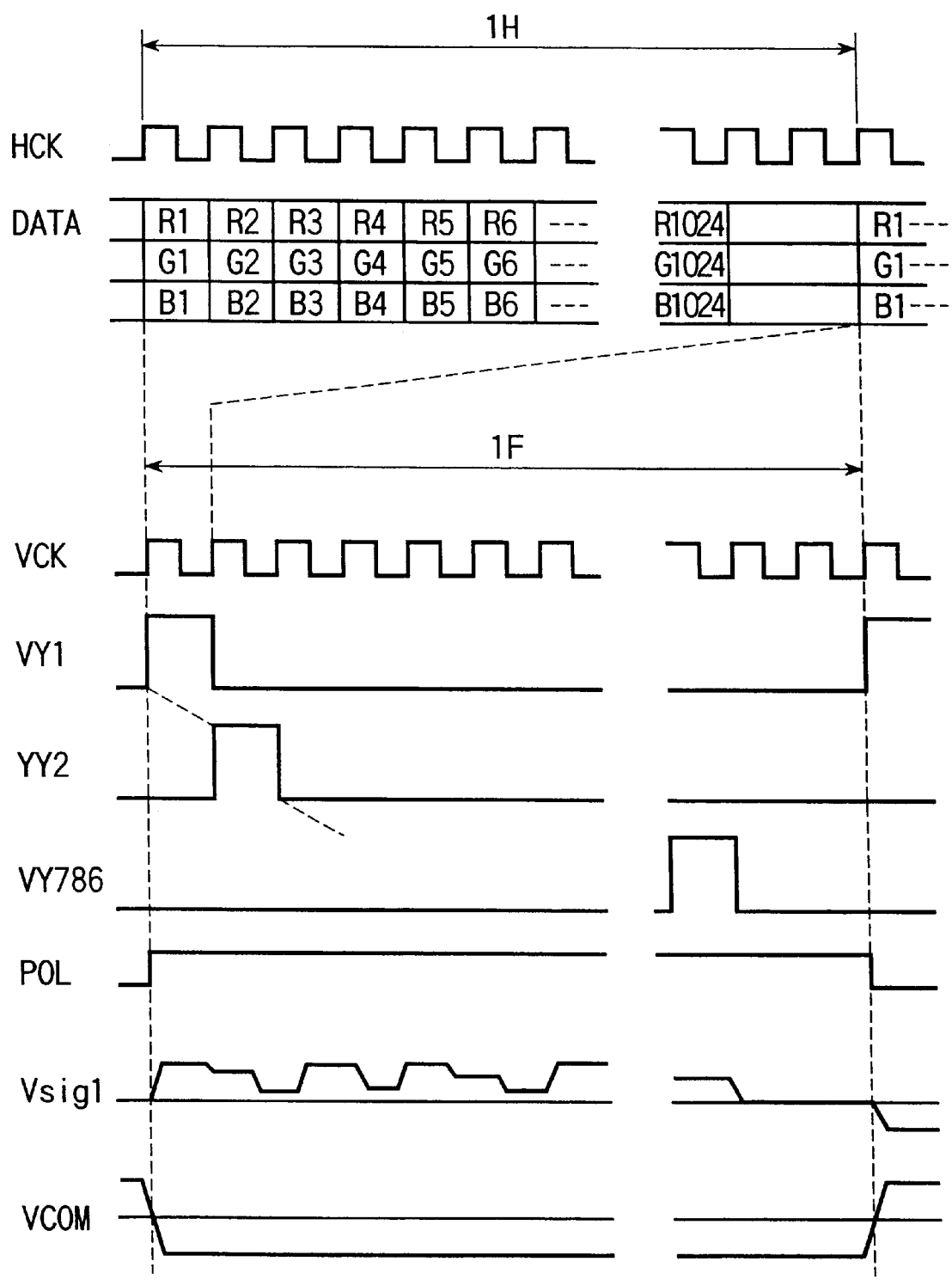
FIG. 6 is a timing chart showing waveforms for driving the liquid crystal display device shown in FIG. 1.

Next, the driving circuit section 600 will be described with reference to FIGS. 5 and 6. The driving circuit section 600 includes a controller 641 which receives digital data DATA and a synchronization signal Sync supplied from the outside to output a vertical scanning start signal VST and a vertical scanning clock signal VCK to a vertical scanning circuit 611, to output a horizontal scanning start signal HST, a horizontal scanning clock signal HCK, a polarity inversion signal POL, and to output the digital data DATA in synchronism with these signals to a horizontal scanning circuit 621, and the polarity inversion signal POL to a counter electrode driving circuit 631.

The vertical scanning circuit 611 has a shift register for serially shifting the vertical scanning start signal VST in response to the vertical scanning clock signal VCK to output scanning signals VY1 to VY786 to the scanning lines.

The horizontal scanning circuit 621 includes a shift register for serially shifting the horizontal scanning start signal HST in response to the horizontal scanning clock signal HCK, a sampling circuit for sequentially sampling the digital data DATA according to outputs of the shift register, and a DAC circuit for D/A converting the digital data DATA into video signal voltages Vsig1—Vsig3072 to be supplied to the scanning lines, on the basis of the polarity inversion signal POL.

The counter electrode driving circuit 631 is arranged to output a counter electrode voltage VCOM determined according to the polarity inversion signal POL.

[First Example]

The first example of the alignment structure of the liquid crystal panel 500 will be described with reference to FIG. 7.

Figure 7:
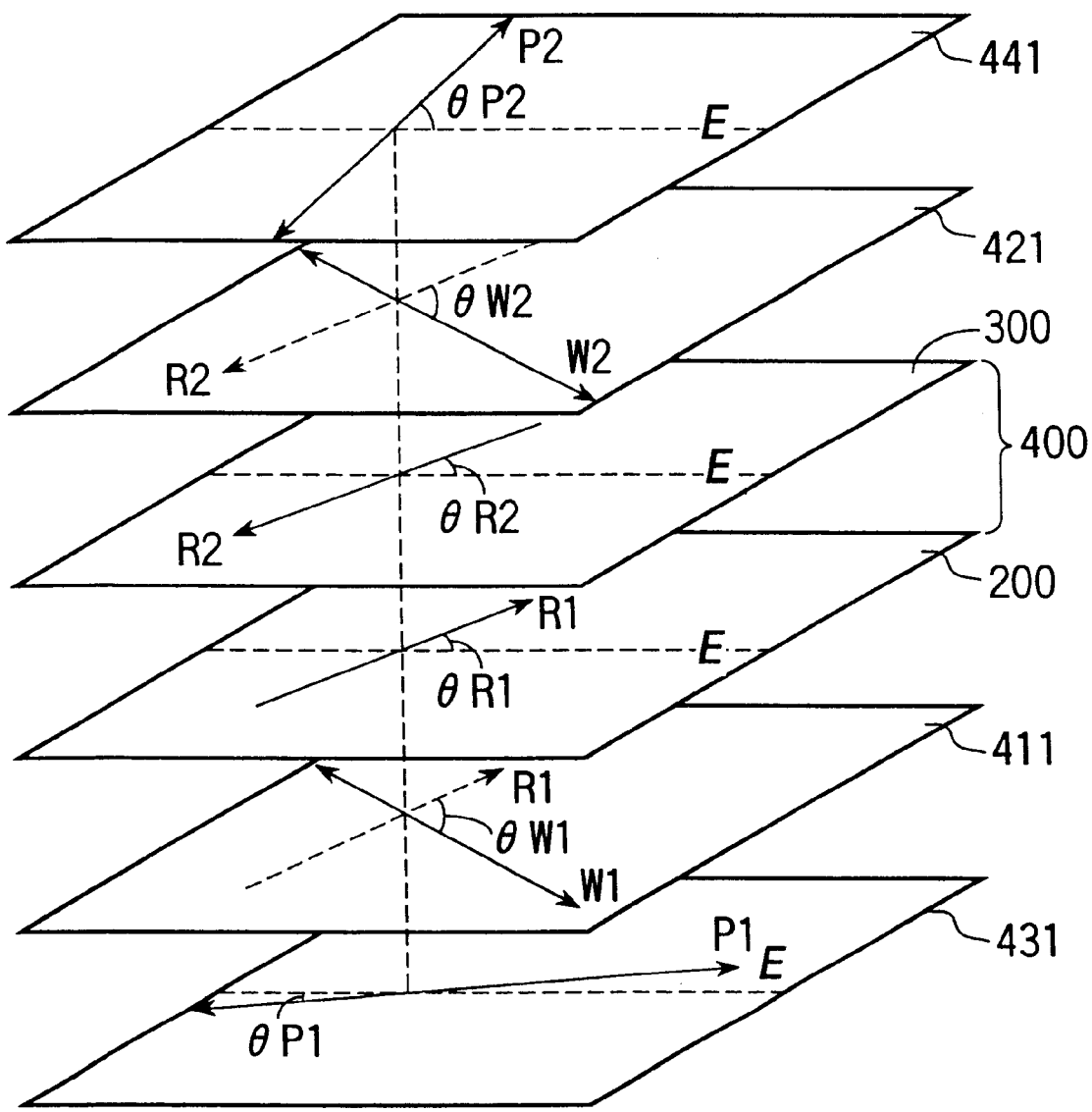
FIG. 7 schematically shows an example of an alignment structure of a liquid crystal panel shown in FIG. 3.

In FIG. 7, E denotes an electric field direction of the lateral electric field applied between the pixel electrode 271 and the counter electrode 281. The aligning films 291 and 341 of the array and counter substrates 200 and 300 form angles θR1 and θR2 of 70° with respect to the direction of the lateral electric field E, and the liquid crystal molecules on the array and counter substrates 200 and 300 are respectively aligned in the alignment directions R1 and R2 opposite to each other.

The optical retardation plates 411 and 421 are formed as uniaxial oriented films made of triacetylcellulose and having a retardation value of 30 nm. The optical axes W1 and W2 of the optical retardation plates 411 and 421 are set to respectively form angles θW1 and θW2 of substantially 90° with respect to the alignment directions R1 and R2. Polarization axes P1 and P2 of the polarizing plates 431 and 441 are arranged to be orthogonal to each other and slanted toward the alignment direction R1 from the lateral electric field direction E by 3° and by 93°, respectively. In this manner, the liquid crystal panel 500 of the normally-white mode is formed.

In the liquid crystal display device 100 having the above-mentioned structure, when a voltage of 3.6V is applied to the liquid crystal, the light transmittance is set at a maximum level (bright state), i.e., 3.3% (33% in a dummy cell from which influence by a color filter and the like is excluded). When a voltage of 10.0V is applied to the liquid crystal, the light transmittance is set at a minimum level (dark state), i.e., 0.03% (0.3% in the dummy cell). As should be clear from this, the device attains a remarkably high contrast ratio.

Regarding to the response speed, the switching from the bright state to the dark state takes 9 ms, and the switching from the dark state to the bright state takes 17 ms: a sufficiently high response speed is also recognized.

[Example for Comparison]

In contrast, in a liquid crystal display device having the same structure as that of the first example, from which the optical retardation plates 411 and 421 are removed, the bright state is attained when a voltage of 3.8V is applied to the liquid crystal, and the light transmittance of 3.1% (31%, in the dummy cell) is attained in the time. The dark state is attained when the liquid crystal is applied with a voltage of 10.2V, and light transmittance of 0.09% (0.9% in the dummy cell) is recognized. As is clear from this, a sufficient contrast ratio as attained by the structure of the first example could not be attained with use of the structure of this example.

According to the first example, the twisted alignment of the liquid crystal molecules, which may increase the light transmittance, in the dark state, is compensated by the optical retardation plates 411 and 421. By virtue of the optical retardation plates, the alignment direction of the liquid crystal molecules are set to be a substantially uniform direction determined by only the liquid crystal molecules constituting the middle part of the liquid crystal cell 400, which substantially contributes to the switching of display state. In this manner, the light transmittance in the dark state could be effectively suppressed. In the bright state, the twisted alignment of the liquid crystal molecules is compensated by the optical retardation plates 411 and 421 so that the alignment direction of the liquid crystal molecules forms an angle of substantially 45° with respect to the polarization axes P1 and P2 of the polarizing plates 431 and 441 in order to form an ideal homogeneous alignment. In this manner, the light transmittance in the bright state could be sufficiently enhanced.

In addition to the above, according to the first example, the switching of the liquid crystal molecules in the middle part of the liquid crystal cell 400 other than those near the main surfaces of the substrates 101 and 201 is mainly used to enhance the response speed since the alignment of the liquid crystal molecules is twisted both in the bright and dark states. Further, in the switching to the bright state, the voltage applied to the liquid crystal cell 400 increases as compared with the switching from the initial molecular alignment.

[Second Example]

Next, the second example of the liquid crystal panel 500 will be described below. In this example, the optical retardation plates 411 and 421 which have retardation twisted in a direction of thickness are interposed, instead of the optical retardation plates of the first example. The optical retardation plates 411 and 421 are arranged such that optical axes W1 and W2 on sides on which the plates 411 and 421 contact glass substrates 201 and 301 form angles θW1 and θW2 of substantially 90° with respect to alignment directions R1 and R2, respectively. The twisting angles of the optical axes are set at substantially 70° along a twisting direction of the liquid crystal molecules. The optical retardation plates 411 and 421 are set to have the retardation value of 40 nm in the direction of the optical axes W1 and W2 contacting the glass substrates 201 and 301. The liquid crystal display device of the second example is formed in the similar manner to that of the first example, except that the anisotropic refractive index Δn of the liquid crystal cell 400 is set at 0.103 in order to compensate the reduction of the retardation effective to the switching of the liquid crystal display device.

In the second example, when the voltage of 3.4V is applied to the liquid crystal, the light transmittance is set at the maximum level (the bright state), i.e., the light transmittance of 3.5% (35% in the dummy cell), and when the voltage of 9.8V is applied to the liquid crystal, the light transmittance is set at the minimum level (the dark state), i.e., the light transmittance of 0.02% (0.2% in the dummy cell). As is clear from this, the device of the second example also attained remarkably high level of contrast ratio. The response speed is also recognized to be sufficiently high: the switching from the bright state to the dark state takes 8 ms, and the switching from the dark state to the bright state takes 17 ms.

[Third Example]

Figure 8:
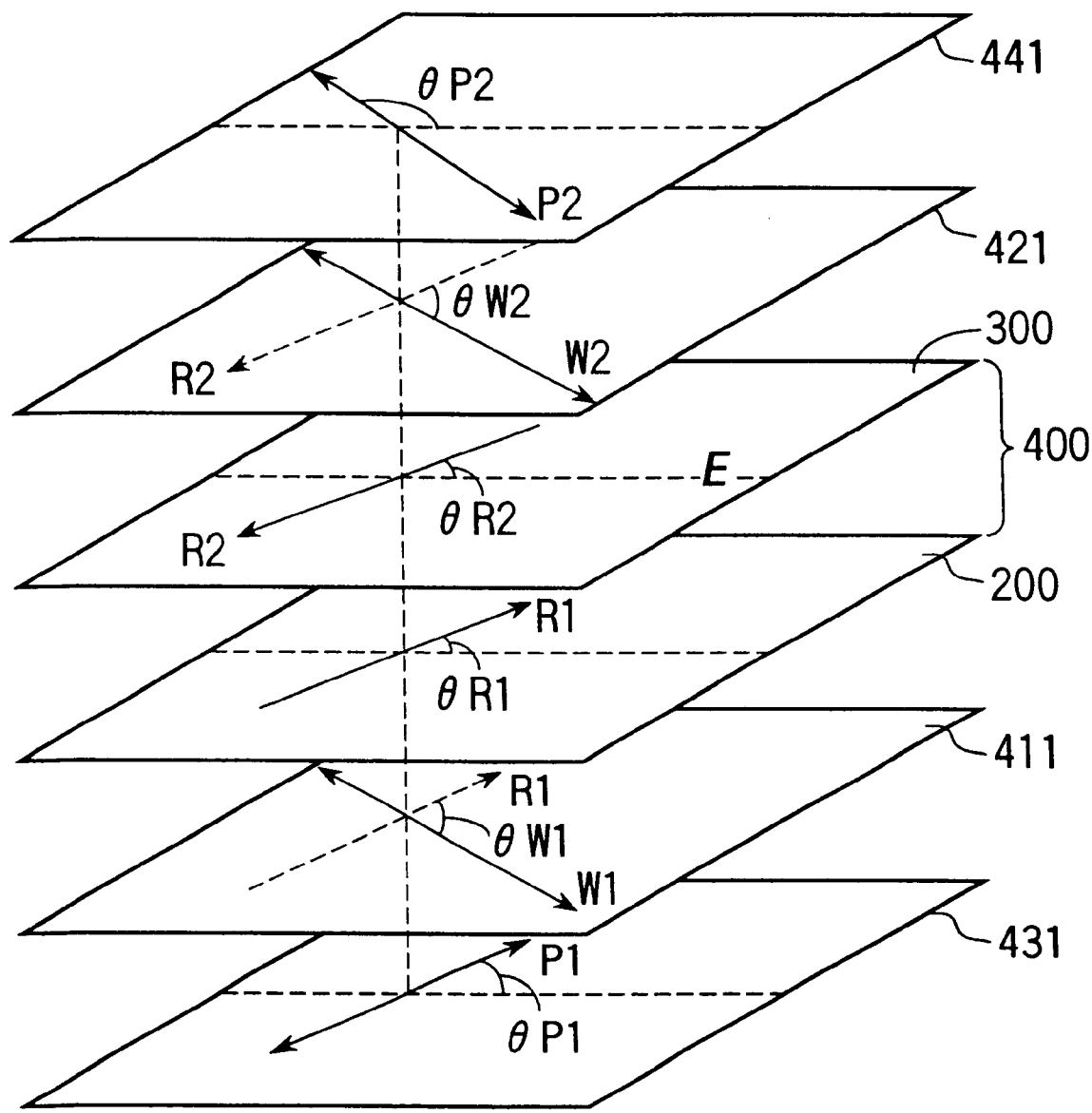
FIG. 8 schematically shows another example of the alignment structure of the liquid crystal panel shown in FIG. 3.
Figures 9, 10:
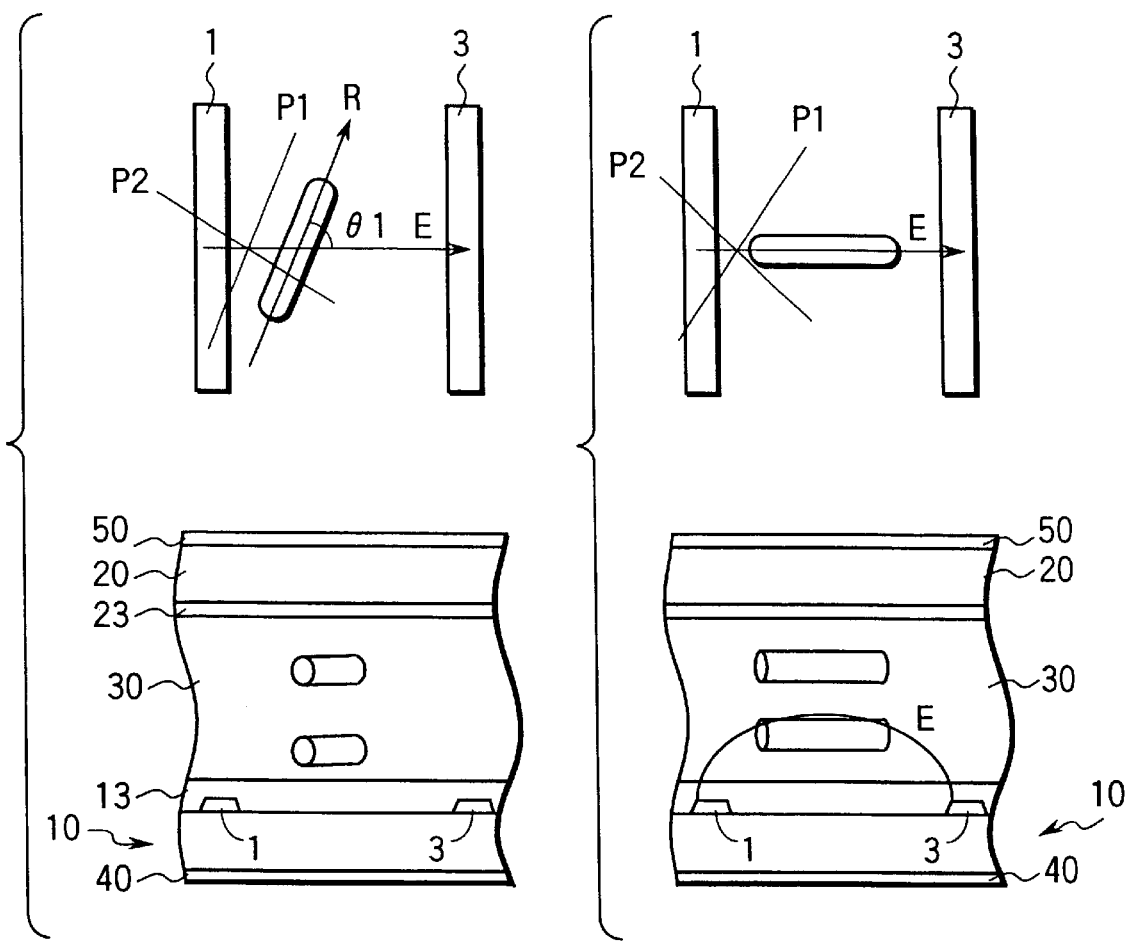
FIGS. 9 and 10 are views for explaining the conventional liquid crystal display device using a lateral electric field.

The third example of the alignment structure of the liquid crystal panel 500 will be described with reference to FIG. 8. The liquid crystal panel 500 of the third example is constituted as the normally-black mode device.

Unlike the first example, the liquid crystal cell 400 of the third example is formed of nematic liquid crystal material having the anisotropic dielectric constant $\in$ of +9.9, the anisotropic refractive index $\Delta n$ of 0.09, and the viscosity of 21 cps. In the third example, a uniaxial oriented film of polycarbonate having a retardation value of 50 nm is used to form the optical retardation plates 411 and 421, which are arranged to have the optical axes W1 and W2 substantially orthogonal to the alignment directions R1 and R2. The polarizing plates 431 and 441 are arranged such that the polarization axis P1 of the polarizing plate 431 is slanted toward the alignment direction R1 from the lateral electric field direction E by an angle of $\theta P1$ of 70° (such that the polarization axis P1 corresponds to the alignment direction R1), the polarization axis P2 of the polarizing plate 441 is slanted toward the alignment direction R1 from the lateral electric field direction E by an angle $\theta P2$ of 160°, and the axes P1 and P2 are orthogonal to each other.

In the third example, when a voltage of 1.0V is applied to the liquid crystal, the light transmittance is set at a minimum level (the dark state), i.e., 0.02% (0.2% in the dummy cell). When a voltage of 6.3V is applied to the liquid crystal, the light transmittance is set at a maximum level (the bright state), i.e., 3.1% (31% in the dummy cell). As should be clear from this, the device of the third example attains a remarkably high contrast ratio.

Since the liquid crystal in the third example is applied with the voltage between 1.0V and 6.3V, the response speed is lower than those attained in the other examples.

[Fourth Example]

The fourth example of the alignment structure of the liquid crystal panel 500 will be described below. The liquid crystal panel 500 of the fourth example is also constituted as the normally-black mode device.

Unlike the third example, the polarizing plates 431 and 441 of the fourth example are arranged such that the polarization axis P1 of the polarizing plate 431 is slanted toward the alignment direction R1 from the lateral electric field direction E by an angle of $\theta P1$ of 60°, the polarization axis P2 of the polarizing plate 441 is slanted toward the alignment direction R1 from the lateral electric field direction E by an angle $\theta P2$ of 150°, the axes P1 and P2 are orthogonal to each other. In short, the polarizing plates are arranged not by making the polarization axis P1 of the polarizing plate 431 correspond to the alignment direction R1, but by reducing the angles set in the third example by 10° in the twisting direction of the liquid crystal molecules to offset with reference to the twisted alignment of the liquid crystal molecules.

In the fourth example, when a voltage of 2.4V is applied to the liquid crystal, the light transmittance is set at a minimum level (the dark state), i.e., 0.04% (0.4% in the dummy cell). When a voltage of 8.4V is applied to the liquid crystal, the light transmittance is set at a maximum level (the bright state), i.e., 3.1% (31% in the dummy cell). As should be clear from this, the device attains remarkably high contrast ratio. The response speed is also recognized to be sufficiently high: the switching from the bright state to the dark state takes 30 ms, and the switching from the dark state to the bright state takes 10 ms.

In this example, the dark state is attained by applying a low voltage. In accordance therewith, the polarizing plate 431 is arranged to have an orientation offset with respect to the alignment direction, thereby leakage light is more decreased to attain high contrast in comparing the examples described above.

[Fifth Example]

The fifth example of the alignment structure of the liquid crystal panel 500 will be described below. The liquid crystal panel 500 of the fifth example is constituted as the normally-black mode device.

The device of the fifth example differs from the fourth example in that the polarizing plate 441 is arranged so as to incline a polarization axis P2 of the polarizing plate 441 by an angle $\theta P2$ of 155° in the alignment direction R1 with respect to the lateral electric field direction E, such that the axis P1 of the polarizing plate 431 and the axis P2 cross each other to form an angle of 95° larger than a right angle formed in the other examples.

In the fifth example, when a voltage of 2.2V is applied to the liquid crystal, the light transmittance is set at a minimum level (the dark state), i.e., 0.03% (0.3% in the dummy cell). When a voltage of 8.6V is applied to the liquid crystal, the light transmittance is set at a maximum level (the bright state), i.e., 3.1% (31% in the dummy cell). As should be clear from this, the device attains remarkably high contrast ratio.

The response speed is also recognized to be sufficiently high: the switching from the bright state to the dark state takes 28 ms, and the switching from the dark state to the bright state takes 8 ms.

According to the fifth example, by setting the crossing angle of the polarizing plates 431 and 441 larger than 90°, the deviation of polarized light components due to the alignment of the liquid crystal molecules could be compensated, thereby higher contrast in comparing with the fourth example is attained.

[Sixth Example]

The sixth example of the alignment structure of the liquid crystal panel 500 will be described below. The liquid crystal panel 500 of the sixth example is also constituted as the normally-black mode device.

The sixth example differs from the fifth example in that an unaxial stretched film of polycarbonate having a retardation value of 100 nm is used as the optical retardation plates 411 and 421.

According to the liquid crystal display device of the sixth example, when a voltage of 2.1V is applied to the liquid crystal, the light transmittance is set at a minimum level (the dark state), i.e., 0.02% (0.2% in the dummy cell). When a voltage of 8.5V is applied to the liquid crystal, the light transmittance is set at a maximum level (the bright state), i.e., 3.1% (31% in the dummy cell). As should be clear from this, the device attains remarkably high contrast ratio.

The response speed is also recognized to be sufficiently high: the switching from the bright state to the dark state takes 25 ms, and the switching from the dark state to the bright state takes 7 ms.

[Seventh Example]

The seventh example of the alignment structure of the liquid crystal panel 500 will be described below. The liquid crystal panel 500 of the seventh example is constituted in the normally-black mode.

This example also differs from the fifth example in that the optical axes W1 and W2 of the optical retardation plates 411 and 421 contacting the surfaces of the glass substrates 201 and 301 form the angles θW1 and θW2 of substantially 90° with respect to the alignment directions R1 and R2 respectively, and the twisting angle thereof is substantially 20° along the twisting direction of the liquid crystal molecules. The optical retardation plates 411 and 421 have a retardation value of 150 nm in directions of the optical axes W1 and W2 contacting the surfaces of the glass substrates 201 and 301.

In the seventh example, when a voltage of 2.1V is applied to the liquid crystal, the light transmittance is set at a minimum level (the dark state), i.e., 0.01% (0.1% in the dummy cell). When a voltage of 8.0V is applied to the liquid crystal, the light transmittance is set at a maximum level (the bright state), i.e., 3.2% (32% in the dummy cell). As should be clear from this, the device attains remarkably high contrast ratio. The response speed is also recognized to be sufficiently high: the switching from the bright state to the dark state takes 25 ms, and the switching from the dark state to the bright state takes 5 ms.

It is understood that the present invention is not limited to the examples described above, and that various changes and modifications may be effected therein by one skilled in the art without departing from the scope or spirit of the invention.

In the above-mentioned embodiment, the material having positive anisotropic dielectric constant is used for the liquid crystal cell. It goes without saying that the material having negative anisotropic dielectric constant is used for the liquid crystal cell.

In this embodiment, the optical retardation plates are provided to the devices in all the examples. The effect of the present invention can be attained by providing the optical retardation plate to at least one side of the liquid crystal cell of the device. It is more preferable, of course, to provide the optical retardation plate to both sides.

The substrates for the liquid crystal display device can be formed of the optical retardation plates.

The pixel electrode 271 and the counter electrode 281 are arranged to be parallel to each other and to extend in the same direction in various portions in the above-mentioned embodiment. These electrodes can be bent at a predetermined angle in each pixel. In this case, the electric field direction E in each pixel may have more than one direction, but the present invention can be used by setting the electric field direction E as general one.

Further, the driving circuit is arranged outside of the liquid crystal panel in the above-mentioned embodiment. The driving circuit can be incorporated in the liquid crystal panel if TFTs of polycrystalline silicon or the like are formed for the driving circuit.

As described above, the liquid crystal display device of the present invention can sufficiently enhance the response speed and attain a high contrast ratio.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   first and second substrates; a liquid crystal cell held between said first and second substrates and containing liquid crystal molecules arranged to have an alignment corresponding to alignment properties of inner surfaces of said first and second substrates; first and second electrodes formed on said first substrate to apply a lateral electric field substantially parallel to said first and second substrate into said liquid crystal cell; first and second polarizing plates having individual polarization axes and mounted on outer surfaces of said first and second substrates, respectively; and an optical retardation plate interposed at least between said first polarizing plate and said first substrate; wherein an optical axis and retardation value of said optical retardation plate are determined to compensate for twisting of the alignment of said liquid crystal molecules caused upon application of the lateral electric field.

2. A liquid crystal display device according to claim 1, wherein a bright state and a dark state are designated by selectively applying one of first and second voltages between said first and second electrodes, said first and second voltages being substantially not zero and differ from each other.

3. A liquid crystal display device according to claim 2, wherein the first voltage is set lower than the second voltage to designate the bright state by applying the first voltage and to designate the dark state by applying the second voltage.

4. A liquid crystal display device according to claim 3, wherein said liquid crystal molecules are aligned in a predetermined alignment direction R on the inner surfaces of said first and second substrates, and a direction E of the lateral electric field and the predetermined alignment direction R form an angle less than 90° and not less than 45°.

5. A liquid crystal display device according to claim 4, wherein the direction E of the lateral electric field and the alignment direction R form an angle of 60° to 88°.

6. A liquid crystal display device according to claim 2, wherein the first voltage is set lower than the second voltage to designate the dark state by applying the first voltage and to designate the bright state by applying the second voltage.

7. A liquid crystal display device according to claim 6, wherein said liquid crystal molecules are aligned in a predetermined alignment direction R on the inner surfaces of said first and second substrates, and a direction E of the lateral electric field and the predetermined alignment direction R form an angle less than 90° and not less than 45°.

8. A liquid crystal display device according to claim 7, wherein the direction E of the lateral electric field and the predetermined alignment direction R form an angle of 60° to 88°.

9. A liquid crystal display device according to claim 1, wherein said liquid crystal molecules are aligned in a predetermined alignment direction R on the inner surfaces of said first and second substrates, and an optical axis W of said optical retardation plate and the predetermined alignment direction R form an angle of 45° to 135°.

10. A liquid crystal display device according to claim 9, wherein the optical axis W of said optical retardation plate and the alignment direction R form an angle of 60° to 90°.

11. A liquid crystal display device according to claim 1, wherein the retardation value of said optical retardation plate is ⅓ to ⅔ of a retardation value RLc of said liquid crystal cell.

12. A liquid crystal display device according to claim 1, wherein another optical retardation plate is interposed between said second polarizing plate and said second substrate, wherein a retardation value of each optical retardation plate is $1/7$ to $4/5$ of a retardation value RLc of said liquid crystal cell.

13. A liquid crystal display device according to claim 12, wherein the retardation value of each optical retardation plate is $1/4$ to $4/5$ of the retardation value RLc of said liquid crystal cell.

14. A liquid crystal display device according to claim 1, wherein one of the polarization axes of said first and second polarizing plates is offset with reference to a twisted alignment of said liquid crystal molecules.

15. A liquid crystal display device according to claim 14, wherein the polarization axes of said first and second polarizing plates intersect each other at an angle larger than 90°.

16. A liquid crystal display device according to claim 1, wherein said optical retardation plate is formed as a film in a twisted alignment.

17. A liquid crystal display device according to claim 1, wherein said first and second substrates respectively include first and second alignment films which serve as the inner surfaces to align the liquid crystal molecules in a same direction.

18. A liquid crystal display device comprising:
first and second substrates; a liquid crystal cell held between said first and second substrates and containing liquid crystal molecules arranged to have an alignment corresponding to alignment properties of inner surfaces of said first and second substrates; first and second electrodes formed on said first substrate to apply a lateral electric field substantially parallel to said first and second substrate into said liquid crystal cell; first and second polarizing plates having individual polarization axes and mounted on outer surfaces of said first and second substrates, respectively; and first and second optical retardation plates interposed between said first polarizing plate and said first substrate and said second polarizing plate and said second substrate, respectively; wherein when a first lateral electric field is produced to obtain a dark state and a second lateral electric field is produced to obtain a bright state, optical axes and retardation values of said first and second optical retardation plates are determined to compensate for twisting of the alignment of said liquid crystal molecules caused upon application of the first lateral electric field.

19. A liquid crystal display device according to claim 18, wherein the first lateral electric field is smaller than the second electric field.

20. A liquid crystal display device according to claim 19, wherein said first polarizing plate and said first and second optical retardation plates are arranged to obtain substantially linear polarized light output toward said second polarizing plate, and the optical axis of said second polarizing plate is arranged to be substantially orthogonal to the output light when the twisted alignment of said liquid crystal molecules occurs upon application of the first lateral electric field.

21. A liquid crystal display device according to claim 18, wherein the first lateral electric field is larger than the second electric field.

22. A liquid crystal display device according to claim 21, wherein said first polarizing plate and said first optical retardation plate are arranged to obtain substantially linear polarized light output toward said second polarizing plate, and the optical axis of said second polarizing plate is arranged to be substantially orthogonal to the output light when the twisted alignment of said liquid crystal molecules occurs upon application of the first lateral electric field.

23. A liquid crystal display device according to claim 18, wherein said first optical retardation plate is arranged to obtain substantially linear polarized light output toward said second polarizing plate, and the optical axis of said second polarizing plate is arranged to be substantially orthogonal to the output light.

24. A liquid crystal display device according to claim 18, wherein said first and second optical retardation plates have a same structure.

25. A liquid crystal display device according to claim 1, wherein one of said first and second optical retardation plates is formed as a film in a twisted alignment.

26. A liquid crystal display device according to claim 18, wherein said first and second substrates respectively include first and second alignment films which serve as the inner surfaces to align the liquid crystal molecules in a same direction.

27. A liquid crystal display device comprising:
first and second substrates;
a liquid crystal cell held between said first and second substrates and containing liquid crystal molecules arranged to have an alignment corresponding to alignment properties of inner surfaces of said first and second substrates;
first and second electrodes formed on said first substrate to apply a lateral electric field substantially parallel to said first and second substrate into said liquid crystal cell;
first and second polarizing plates having individual polarization axes and mounted on outer surfaces of said first and second substrates, respectively; and
an optical retardation plate interposed at least between said first polarizing plate and said first substrate,
wherein an optical axis and retardation value of said optical retardation plate are determined so that liquid crystal molecules located in a middle of said liquid crystal cell and that contribute to switching of a display state are aligned in a substantially uniform direction, and this alignment direction is determined as a reference for improving a light transmittance in a bright state and suppressing light leakage in a dark state.

* * * * *